United States Patent [19]

Yamada et al.

[11] Patent Number: 5,434,709
[45] Date of Patent: Jul. 18, 1995

[54] WAVELENGTH-SELECTIVE PHASE GRATING TYPE OPTICAL LOW-PASS FILTER COMPRISING ADHESIVE LAYER BETWEEN TRANSPARENT LAYERS

[75] Inventors: Katsu Yamada, Matsubara; Hiroaki Okayama, Hirakata; Shusuke Ono, Takatsuki, all of Japan

[73] Assignee: Matsushita Electric Industrial Co., Ltd., Osaka, Japan

[21] Appl. No.: 101,682

[22] Filed: Aug. 4, 1993

[30] Foreign Application Priority Data

Aug. 5, 1992 [JP] Japan .................... 4-208715

[51] Int. Cl.⁶ .................... G02B 5/18
[52] U.S. Cl. .................... 359/569; 359/574
[58] Field of Search ........... 359/568, 569, 571, 573, 359/574, 575, 885

[56] References Cited

U.S. PATENT DOCUMENTS

| | | | |
|---|---|---|---|
| 3,911,479 | 10/1975 | Sakurai | 359/575 |
| 4,093,346 | 6/1978 | Nishino et al. | 359/885 |
| 4,178,611 | 12/1979 | Okano | 359/569 |
| 4,477,148 | 10/1984 | Tsuji et al. | 359/837 |
| 4,484,797 | 11/1984 | Knop et al. | 359/568 |
| 4,795,236 | 1/1989 | Ise | 359/569 |
| 4,878,737 | 11/1989 | Ise | 359/885 |
| 4,998,800 | 3/1991 | Nishida et al. | 359/569 |
| 4,998,801 | 3/1991 | Shiraishi et al. | 359/885 |
| 5,237,452 | 8/1993 | Okayama et al. | 359/574 |
| 5,280,388 | 1/1994 | Okayama et al. | 359/569 |

FOREIGN PATENT DOCUMENTS

| | | | |
|---|---|---|---|
| 0186166 | 7/1986 | European Pat. Off. | G02B 5/18 |
| 0454409 | 10/1991 | European Pat. Off. | G02B 27/46 |
| 0531926 | 3/1993 | European Pat. Off. | G02B 5/18 |
| 64-72119 | 3/1989 | Japan | G02B 27/46 |
| 3-191319 | 8/1991 | Japan | G02B 27/46 |

*Primary Examiner*—Frank Gonzalez
*Attorney, Agent, or Firm*—Willian Brinks Hofer Gilson & Lione

[57] ABSTRACT

In a wavelength-selective phase-grating type optical low-pass filter including at least a pair of adjacent first and second transparent layers, there is provided at least one adhesive layer through which a pair of adjacent first and second transparent layers stacked on each other in a phase grating form for generating a phase difference distribution on the boundary surface between the pair of adjacent first and second transparent layers. The optical low-pass filter satisfies the following conditions under a condition of 470 nm$<\lambda<$580 nm: (a) No $(\lambda)$=Ni $(\lambda)$, (b) $\nu d1<\nu d2$ or $\nu d1>\nu d2$, and (c) $0.9<Np(\lambda) / No(\lambda)<1.1$, where $\lambda$ is a wavelength of light passing through the optical low-pass filter, No $(\lambda)$ and Ni $(\lambda)$ are refractive indexes of the first and second transparent layers, respectively, at the wavelength $\lambda$, $\nu d1$ and $\nu d2$ are Abbe's numbers of the first and second transparent layers, respectively, No$(\lambda)$ is a refractive index of the adhesive layer at the wavelength $\lambda$, Np$(\lambda)$ is a refractive index of either one of the first and second transparent layers at the wavelength $\lambda$, thereby obtaining such low-pass effects as preventing decrease of an MTF value of the wavelength band of green.

8 Claims, 10 Drawing Sheets

WAVELENGTH-SELECTIVE PHASE GRATING TYPE OPTICAL LOW-PASS FILTER COMPRISING ADHESIVE LAYER BETWEEN TRANSPARENT LAYERS

BACKGROUND OF THE INVENTION

1. Field of the Invention

The present invention relates to a wavelength-selective phase grating type optical low-pass filter, more particularly, to a wavelength-selective phase grating type optical low-pass filter comprising an adhesive layer between a pair of transparent layers, for use in an optical system such as a single-tube color video camera or a color video camera employing a solid-state image sensor having a color separation filter.

2. Description of the Prior Art

Conventionally, in a video camera or the like employing a solid-state CCD image sensor or an image pickup tube, an image of a subject focused on the CCD image sensor is spatially and discretely sampled to obtain output image data, with a predetermined sampling frequency equal to a Nyquist frequency of the CCD image sensor. In this case, when the optical image data of the subject image has spatial frequency components higher than the spatial sampling frequency of the CCD image sensor, the output image data generated by the solid-state CCD image sensor contains data of a configuration or phantom data which are not included in the subject data.

In other words, such frequency components higher than the Nyquist frequency which can not be picked up by the solid-state CCD image sensor are outputted in a form of phantom data such as aliasing components, Moire, and phantom color.

For this reason, in the above-mentioned video camera or the like, there has been conventionally employed a conventional practical method of limiting or attenuating such high spatial frequency components of a subject image data to be inputted to the solid-state CCD image sensor by arranging an optical low-pass filter in the CCD image sensor system, thereby preventing generation of phantom color and phantom signal.

For the above-mentioned purpose, the optical low-pass filter has been made utilizing a crystal plate having a birefringence characteristic or recently utilizing a phase grating. However, almost all the conventional optical low-pass filters have been intended for obtaining a low-pass effect generally equal over the whole wavelengths.

However, the following technique attempt has been put into practice taking advantage of the fact that the spatial distribution densities of respective color separation filters, i.e., the spatial frequencies thereof are different from each other in respective transmission wavelength bands. The technique is that an image signal in a wavelength band having a distribution of higher spatial frequencies is subjected to sampling at a relatively higher sampling frequency, while another image signal in a wavelength band having a distribution of lower spatial frequencies is subjected to sampling at a relatively lower sampling frequency, thereby obtaining appropriate image data.

A conventional optical low-pass filter comprising a pair of adjacent transparent layers adhering to each other has been suggested in U.S. Pat. No. 5,237,452, as issued, based on the Japanese patent laid-open publication No. 3-230156, wherein refractive indexes of adjacent transparent layers at a wavelength are the same as each other, and the adjacent transparent layers of materials have Abbe's numbers different from each other, thereby attenuating a particular wavelength component. However, when an adhesive layer between a pair of adjacent transparent layers has a relatively large thickness or a distribution of the thickness, the adhesive layer becomes a phase grating layer, and then there is a possibility of not obtaining a desirable low-pass effect.

When such a conventional optical low-pass filter is constructed using a pair of transparent layers made of materials different from each other, it is always necessary to insert an adhesive layer. In this case, there is such a possibility that the adhesive layer has a relatively large thickness or a distribution of the thickness. In this case, the adhesive layer becomes a phase grating layer, and then wavelength components may be attenuated or cut off up to a wavelength at which the low-pass effect is unnecessary.

SUMMARY OF THE INVENTION

An object of the present invention is therefore to provide a wavelength-selective phase grating type optical low-pass filter capable of not attenuating an MTF value of green or having a higher MTF value of green, even though an adhesive layer is inserted between a pair of transparent layers.

Another object of the present invention is to provide a wavelength-selective phase grating type optical low-pass filter capable of having an improved high resolution in visual characteristics, even though an adhesive layer is inserted between a pair of transparent layers.

In order to achieve the aforementioned objective, according to one aspect of the present invention, there is provided a wavelength-selective phase-grating type optical low-pass filter comprising:

at least a pair of adjacent first and second transparent layers; and at least one adhesive layer through which said pair of adjacent first and second transparent layers stacked on each other in a phase grating form for generating a phase difference distribution on the boundary surface between said pair of adjacent first and second transparent layers, wherein said optical low-pass filter satisfies the following conditions under a condition of $470\ nm < \lambda < 580\ nm$:

(a) $No\ (\lambda) = Ni\ (\lambda)$, (b) $vd1 < vd2$ or $vd1 > vd2$, and (c) $0.9 < Np(\lambda) / No(\lambda) < 1.1$, where $\lambda$ is a wavelength of light passing through said optical low-pass filter, $No\ (\lambda)$ and $Ni\ (\lambda)$ are refractive indexes of said first and second transparent layers, respectively, at said wavelength $\lambda$, $vd1$ and $vd2$ are Abbe's numbers of said first and second transparent layers, respectively, $No(\lambda)$ is a refractive index of said adhesive layer at said wavelength $\lambda$, $Np(\lambda)$ is a refractive index of either one of said first and second transparent layers at said wavelength $\lambda$, thereby obtaining such low-pass effects as preventing decrease of an MTF value of the wavelength band of green.

In the preferred embodiment of above-mentioned wavelength-selective phase-grating type optical low-pass filter, wherein each of respective boundary surfaces of said first and second transparent layers has a cross section having such a shape that a plurality of trapezoids are periodically formed in a predetermined direction so that the respective boundary surfaces thereof are parallel to each other.

In the preferred embodiment of the above-mentioned wavelength-selective phase-grating type optical low-pass filter, wherein said phase grating form satisfies the following conditions:

$0.1 < a/A < 0.9,$ (a)
$0.1 < b/A < 0.9,$ (b)
$(a + b)/A < 1.0,$ and (c)

$$\frac{\frac{1}{2} - \frac{4f\lambda Rd}{A}}{\frac{1}{2} - \frac{4f\lambda Bd}{A}} < \left(\frac{NR}{NB}\right)^2 < \frac{2 - \frac{4f\lambda Rd}{A}}{1 - \frac{4f\lambda Bd}{A}},$$ (d)

where A is a pitch of said phase grating of said plurality of trapezoids, a is a width of a top flat portion of each of said plurality of trapezoids, b is a width of a bottom flat portion of each of said plurality of trapezoids, d is a distance between said optical low-pass filter and an image forming surface of an image sensor provided close to said second transparent layer, f is a predetermined cut-off spatial frequency, $\lambda R$ is a center wavelength of the wavelength band of red, $\lambda B$ is a center wavelength of the wavelength band of blue, NR is a difference between said refractive indexes of said first and second transparent layers at said wavelength $\lambda R$, and NB is a difference between said refractive indexes of said first and second transparent layers at said wavelength $\lambda B$.

The above-mentioned wavelength-selective phase-grating type optical low-pass filter preferably further comprises:

a third transparent layer; and a further adhesive layer through which said second and third transparent layers stacked on each other in a further phase grating form for generating a further phase difference distribution on the boundary surface between said second and third transparent layers, said further phase grating form being perpendicular to said phase grating form.

Accordingly, the attenuation of the MTF value in the wavelength band of green can be prevented, namely, the cut-off spatial frequency of the wavelength band of green can be set to a spatial frequency higher than those of the wavelength bands of red and blue. This results in improvement in the resolution or a higher resolution in the visual characteristics.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 2b is a schematic cross sectional view of the wavelength-selective phase-grating type optical low-pass filter shown in FIG. 2a;

DETAILED DESCRIPTION OF THE PREFERRED EMBODIMENTS

The preferred embodiments according to the present invention will be described below with reference to the attached drawings.

<Structure of Optical low-pass filter>

Figure 1:
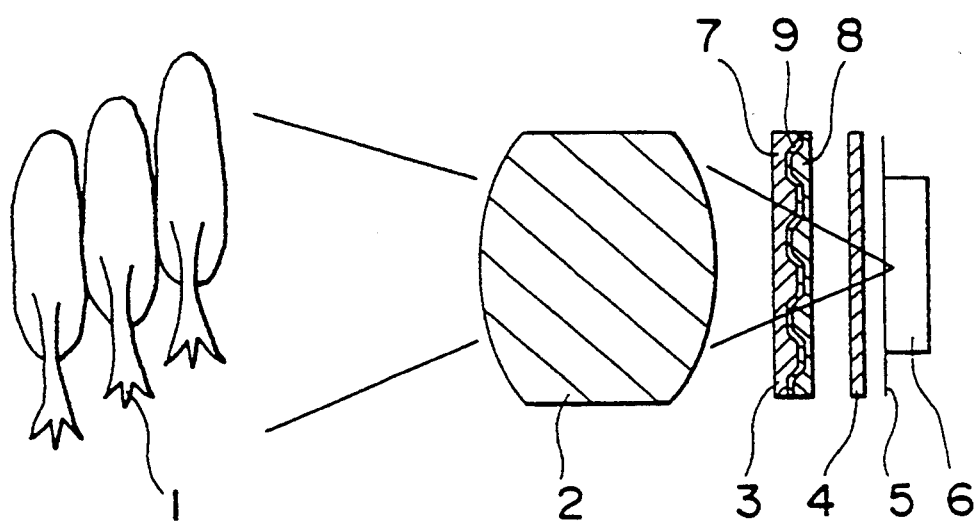
FIG. 1 is a schematic cross sectional view showing an arrangement of an optical system comprising a wavelength-selective phase-grating type optical low-pass filter of a preferred embodiment according to the present invention.

FIG. 1 shows an arrangement of an optical system comprising a wavelength-selective phase-grating type optical low-pass filter of a preferred embodiment according to the present invention.

Referring to FIG. 1, reference numeral 1 denotes a subject, an image of which (referred to as a subject image hereinafter) is to be picked up, and reference numeral 2 denotes a lens system comprising at least one lens. Reference numeral 3 denotes a wavelength-selective phase-grating type optical low-pass filter according to the present invention, which is disposed between the lens system 2 and a color separation filter 4. Further, reference numeral 5 denotes an image forming surface located on a CCD image sensor 6 on which the subject image is formed through the lens system 2, the optical low-pass filter 3 and the color separation filter 4.

In the preferred embodiment, low-pass effects are obtained at respective wavelengths by arranging the optical low-pass filter 3 between the CCD image sensor 6 and the subject 1, as shown in FIG. 1. However, the position of the optical low-pass filter 3 is not limited to this, and the optical low-pass filter 3 may be provided at either a position within the lens system 2 or another position between the subject 1 and the lens system 2.

Figure 2A:
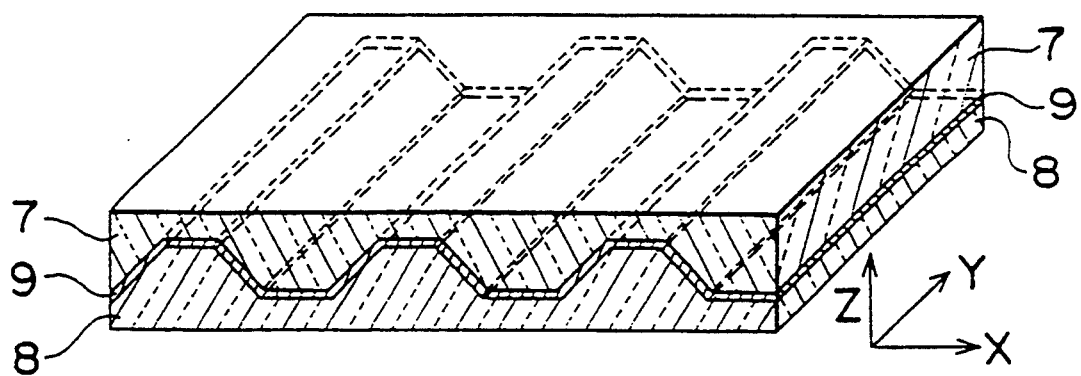
FIG. 2a is a schematic perspective view of the wavelength-selective phase-grating type optical low-pass filter shown in FIG. 1, comprising a pair of adjacent transparent layers and an adhesive layer inserted between a pair of adjacent transparent layers.
Figure 2B:
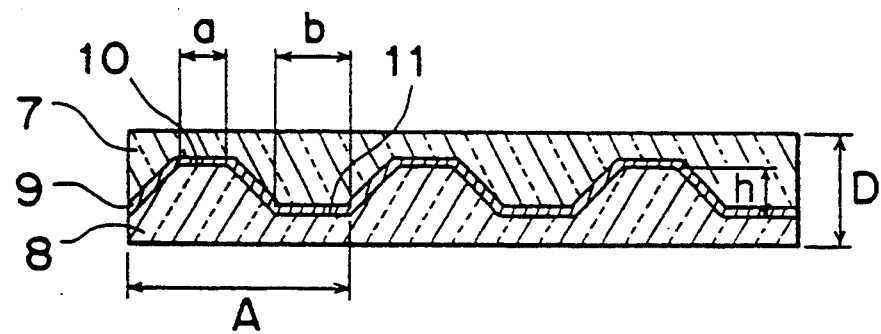

FIG. 2a shows the wavelength-selective phase-grating type optical low-pass filter 3 shown in FIG. 1, and FIG. 2b shows a cross section thereof.

Referring to FIGS. 2a and 2b, the optical low-pass filter 3 comprises a pair of adjacent transparent layers 7 and 8 each made of glass, and an adhesive layer 9 of an adhesive agent of ultraviolet rays hardening resin, which is inserted between the transparent layers 7 and 8, wherein the transparent layer 7 is located on the side of the subject 1, and another transparent layer 8 is located on the side of the CCD image sensor 6. Further, the transparent layers 7 and 8 are provided for forming a phase difference shape for generating a phase difference distribution, or a phase grating shape.

In the optical low-pass filter 3 shown in FIG. 2a as constructed above, the light reflected from the subject 1 is incident onto the top surface of the transparent layer 7, and passes through the transparent layer 7, the adhesive layer 9 and the transparent layer 8. Finally, the reflected light is outputted from the bottom surface of the transparent layer 9, toward an CCD image sensor (not shown).

Referring to FIG. 2b, each of respective boundary surfaces of a pair of transparent layers 7 and 8 has a cross section having such a shape that a plurality of trapezoids are periodically formed in a direction parallel to the X-axis direction so that the respective boundary surfaces thereof are parallel to each other. It is to be noted that, when cutting the optical low-pass filter 3 at respective points along the Y-axis direction in parallel to a ZX surface, respective cross sections are the same as each other, as shown in FIG. 2a.

In this case, as shown in FIG. 2b, a top flat portion of each trapezoid has a width of "a", and a bottom flat portion thereof has a width of "b", and a period length or pitch of each trapezoid in the phase grating is represented by "A". Further, each trapezoid has a height of "h", and "D" denotes the thickness of the optical low-pass filter 3.

<Preferable conditions>

In the preferred embodiment, the following equations (1) to (3) are preferably satisfied for an optimum condition for designing the optical low-pass filter 3:

$$\frac{\frac{1}{2} - \frac{4f\lambda Rd}{A}}{\frac{1}{2} - \frac{4f\lambda Bd}{A}} < \left(\frac{NR}{NB}\right)^2 < \frac{2 - \frac{4f\lambda Rd}{A}}{1 - \frac{4f\lambda Bd}{A}}, \quad (1)$$

$$\frac{1}{4\lambda Bf} < \frac{d}{A} < \frac{1}{4\lambda Rf}, \quad (2)$$

where f is a cut-off spatial frequency or so-called $$\left(\frac{NR}{NB}\right)^2 < \frac{\frac{\lambda R}{\lambda B} - 4f\lambda R\left(\frac{d}{A}\right)}{\frac{\lambda R}{\lambda B} - 4f\lambda B\left(\frac{d}{A}\right)}, \quad (3)$$

Nyquist frequency to be set so as to prevent generation of Moire, phantom signal or the like;

$\lambda R$ is the center wavelength of red (R) band;

$\lambda B$ is the center wavelength of blue (B) band;

d is a distance between the optical low-pass filter 3 and the image forming surface 5 of the CCD image sensor 6;

NR is a difference between the refractive indexes of a pair of adjacent transparent layers 7 and 8 at the center wavelength $\lambda R$ of red (R) band; and NB is a difference between the refractive indexes between a pair of adjacent transparent layers 7 and 8 at the center wavelength $\lambda B$ of blue (B) band.

The refractive indexes of the adjacent transparent layers 7 and 8 and the dispersions thereof are preferably set as follows. Under such a condition of the wavelength $\lambda$ in a range of 470 nm $< \lambda <$ 580 nm, namely, in the range within a wavelength band of green of the primary color of the color filter, the materials of glass of a pair of adjacent transparent layers 7 and 8 are preferably selected so as to satisfy the following conditions:

(a) the refractive index No ($\lambda$) of the transparent layer 7 becomes substantially the same as the refractive index Ni ($\lambda$) of the transparent layer 8, namely, No ($\lambda$)=Ni ($\lambda$); and (b) the Abbe's number $\nu do$ of the D-lines of the transparent layer 7 becomes different from the Abbe's number $\nu di$ of the D-lines of the transparent layer 8 by a relatively large amount, namely, either $\nu do < \nu di$ or $\nu do > \nu di$.

In this case, since the difference between the refractive indexes No ($\lambda$) and Ni ($\lambda$) within the wavelength band of green is relatively small, the degree of the diffraction corresponding to an angle of the diffraction caused due to the phase grating type optical low-pass filter 3 becomes small, while the difference between the refractive indexes within a wavelength band of red or blue apart from the wavelength band of green is larger than that within the wavelength band of green, resulting in the degree of the diffraction becomes relatively large within the wavelength band of red or blue.

In other words, within the wavelength band of green within which the degree of the diffraction is relatively small, the low-pass effect due to the optical low-pass filter 3 is relatively small, and then the MTF characteristic of green extends up to a higher spatial frequency. That is, the MTF value of green does not attenuate up to the higher spatial frequency. On the other hand, within the wavelength band of red or blue within which the degree of the diffraction is relatively large, the low-pass effect due to the optical low-pass filter 3 becomes relatively large, and then the MTF characteristic is cut off at a relatively lower spatial frequency. This results in improvement in the resolution or an improved higher resolution in the visual characteristics.

Accordingly, according to the preferred embodiment of the present invention, the parameters of the optical low-pass filter 3 are set so that the cut-off spatial frequency of green is set as high as possible and the cut-off spatial frequency of red or blue is set to a spatial frequency close to that of the conventional optical low-pass filter. For this purpose, taking into consideration such a case that the adhesive layer 9 inserted between a pair of adjacent transparent layers 7 and 8 has a relatively large thickness or a distribution of the thickness thereof, it is necessary to set the shape of the materials of a pair of transparent layers 7 and 8 and the refractive indexes thereof to a desirable shape and desirable values, respectively, and further it is necessary to set the refractive index of the adhesive layer 9 to a desirable value so as to obtain the above-mentioned low-pass effects.

In a preferred embodiment, the size of the phase-grating is designed in such a manner that the width "a"="b" are set to approximately 250 μm, the pitch A is set to approximately 1000 μm, and the height h is set to approximately 97 μm. Any value of the thickness D can be selected so long as the thickness D is sufficiently larger than the height h. It is to be noted that "a", "b", h and A are not limited to these values and any appropriate values are available. 10 In the preferred embodiment, the parameters "a", "b" and A are preferably set to satisfy the following equations (4):

$$0.1 < a/A < 0.9,$$

$$0.1 < a/B < 0.9, \text{ and}$$

$$(a+b)/A < 1.0 \tag{4}$$

In the preferred embodiment, (a) the transparent layer 7 is made of glass, type GFK70 made by Sumida Kogaku Kabushiki kaisha having a refractive index nd of the D-lines of 1.5691 and an Abbe's number νd of 71.3;

(b) the transparent layer 8 is made of glass, type LF6 made by Sumida Kogaku Kabushiki kaisha having a refractive index nd of the D-lines of 1.5673 and an Abbe's number νd of 42.8; and (c) the adhesive layer 9 is made of ultra violet rays hardening resin, type NOA-61 made by Noland.

<Simulation>

The following describes a procedure for obtaining an optimum condition of the phase-grating type optical low-pass filter 3, thereby obtaining equations for the present simulation.

Assuming that, a parameter $\xi = \lambda df$, $\phi$ represents a phase difference, the OTF (Optical Transfer Function) characteristic which is obtained by adding phase data to MTF is represented by the following equation (5):

$$H(\xi) = (1/2 - 2\xi/A) \cdot [\cos(2\phi 2\xi/A) + 1] + (1/\phi)\sin(2\phi 2\xi/A)$$
$$\text{for } 0 \leq \xi \leq A/4,$$
$$= (2\xi/A - 1/2)\cos\phi - [\sin\{2\phi(2\xi/A - 1/2)\} - 2\sin\phi]/(2\phi)$$
$$\text{for } A/4 \leq \xi < A/2 \tag{5}$$

Herein, assuming that $n_1$ is a refractive index of the transparent layer 7, $n_2$ is a refractive index of the transparent layer 8, a phase difference $\phi$ of the phase grating is represented by $\phi = (2\pi h/\lambda) \cdot (n_1 - n_2)$. Herein, by replacing $N = n_1 - n_2$ and $Ac = 4\pi dh/A$, the above equation (5) is represented by the following equation (6):

$$H(f) = (1/2 - 2d\lambda f/A) \cdot [\cos(2AcNf) + 1] + (\lambda/2\pi hN)\sin(2AcNf)$$
$$\text{for } 0 \leq \xi \leq A/4,$$
$$= (2d\lambda f/A - 1/2) \cdot \cos(2\pi hN/\lambda) -$$
$$\{\sin(2AcNf - 2\pi hN/\lambda) - 2\sin(2\pi hN/A)\}/(4\pi hN/A)$$
$$\tag{6}$$

for $A/4 \leq \xi < A/2$

Herein, the OTFs in respect of the primary colors of red (R) and blue (B) are obtained as follows:

(i) In the range of $0 \leq \xi \leq A/4$, OTF(R) and OTF(B) are respectively represented by the following equations:

$$HR(f) = [\tfrac{1}{2} - (2\pi df/A)\lambda R] \cdot [\cos(-2AcNRf) + 1] + (\lambda R/2\pi hNR) \cdot \sin(2AcNRf)$$

$$HB(f) = [\tfrac{1}{2} - (2\pi df/A)\lambda B] \cdot [\cos(-2AcNBf) + 1] + (\lambda B/2\pi hNB) \cdot \sin(2AcNBf)$$

The difference between OTF(R) and OTF(B) is accordingly represented by the following equation:

$$HR(f) - HB(f) = 1/2[\cos(2AcNRf) - \cos(2AcNBf)] - (2df/A)[\{\lambda R\cos(2AcNRf) - \lambda B\cos(2AcNBf)\} + (\lambda R - \lambda B)] + (1/2\pi h)[(\lambda R/NR)\sin(2AcNRf) - (\lambda B/NB)\sin(2AcNBf)]$$

The above equation is approximately developed as follow:

$$HR(f) - HB(f) = (Acf)^2[NR^2\{(4df/A)\lambda R - 1\} - NB^2\{(4df/A)\lambda B - 1\}] \text{ for } 0 \leq \xi \leq A/4$$

(ii) In the range of $A/4 \leq \xi A/2$, the difference between OTF(R) and OTF(B) is represented as follows:

$$HR(f) - HB(f) = (\pi h)^2[(NR/\lambda R)^2 - (NB/\lambda B)^2] + (2df/A)(\lambda R - \lambda B) - (4df/A)(\pi h)^2[(NR/\lambda R)^2 - (NB/\lambda B)^2] - (Acf/2\pi h)(\lambda R - \lambda B)$$
$$= (\pi h)^2[\{(NR/\lambda R)^2 - (NB/\lambda B)^2\} - (4df/A)\{(NR/\lambda R)^2 - (NB/\lambda B)^2\}]$$

for $A/4 \leq \xi < A/2$

In the range of $0 \leq \xi \leq A/4$, when the condition of $HR(f) = HB(f)$ is set,
$HR(f) - HB(f) = 0$
Accordingly, the following (7) is obtained:

$$NR^2\{(4df/A)\lambda R - 1\} - NB^2\{(4df/A)\lambda B - 1\} = 0 \tag{7}$$

In the range of $A/4 \leq \xi < A/2$, when the condition of $HR(f) = HB(f)$ is set,
$HR(f) - HB(f) = 0$
$\{(NR/\lambda R)^2 - (NB/\lambda B)^2\} - (4df/A)\{(NR/\lambda R)^2 - (NB/\lambda B)^2\} = 0$
Accordingly, the following (8) is obtained:

$$(NR/NB)^2 = \{\lambda R/\lambda B - (4df/A)\lambda R\}/\{\lambda B/\lambda R - (4df/A)\lambda B\} \tag{8}$$

Herein, the range to have a solution of the equations (7) and (8) is obtained as follows:

From the range of $A/4 \leq \xi < A/2$, when the range satisfies the equation (8), each value of $\lambda R$ and $\lambda B$ is not limited to one point. Although the relationship between the wavelength bands of red (R) and blue (B) components is represented by $\lambda R \geq \lambda B$, in the typical NTSC (National Television System Committee) color television signal, the wavelength bands of red (R) and blue (B) have wide ranges. Therefore, when considering a visible region in the range from 350 nm to 700 nm, the available range is represented as follows:

$$\tfrac{1}{2} < \lambda B/\lambda R < 2$$

Accordingly, the equation (6) is obtained. By replacing $\xi=\lambda df$ in the range of $A/4 \geq \xi < A/2$ having a solution, the equation (7) can be obtained.

The present simulation is effected using the above-mentioned equations (5) to (8), and further we assume the following parameters:

(a) the refractive index nd of the D-lines of the transparent layer 7 is 1.5691;

(b) the Abbe's number nd of the transparent layer 7 is 71.3;

(c) the refractive index nd of the D-lines of the transparent layer 8 is 1.5673;

(d) the Abbe's number $\nu d$ of the transparent layer is 42.8;

(e) the refractive index nd of the D-lines of the adhesive layer 9 is 1.5594;

(f) the Abbe's number $\nu d$ of the adhesive layer 9 is 51.3; and (g) the optical low-pass filter 3 satisfies not only the above-mentioned equations (2) and (3) but also the following equation (9):

In the preferred embodiment, it is to be noted that no influence is exerted on the performance when exchanging the two transparent layers 7 and 8 with each other.

$$h = \frac{1}{\pi} \sqrt{\frac{\left(\frac{1}{NB}\right)^2 \frac{1}{\lambda B} - \left(\frac{1}{NR}\right)^2 \frac{1}{\lambda R}}{\frac{1}{\lambda R} - \frac{1}{\lambda B}}} \quad (9)$$

Figure 3:
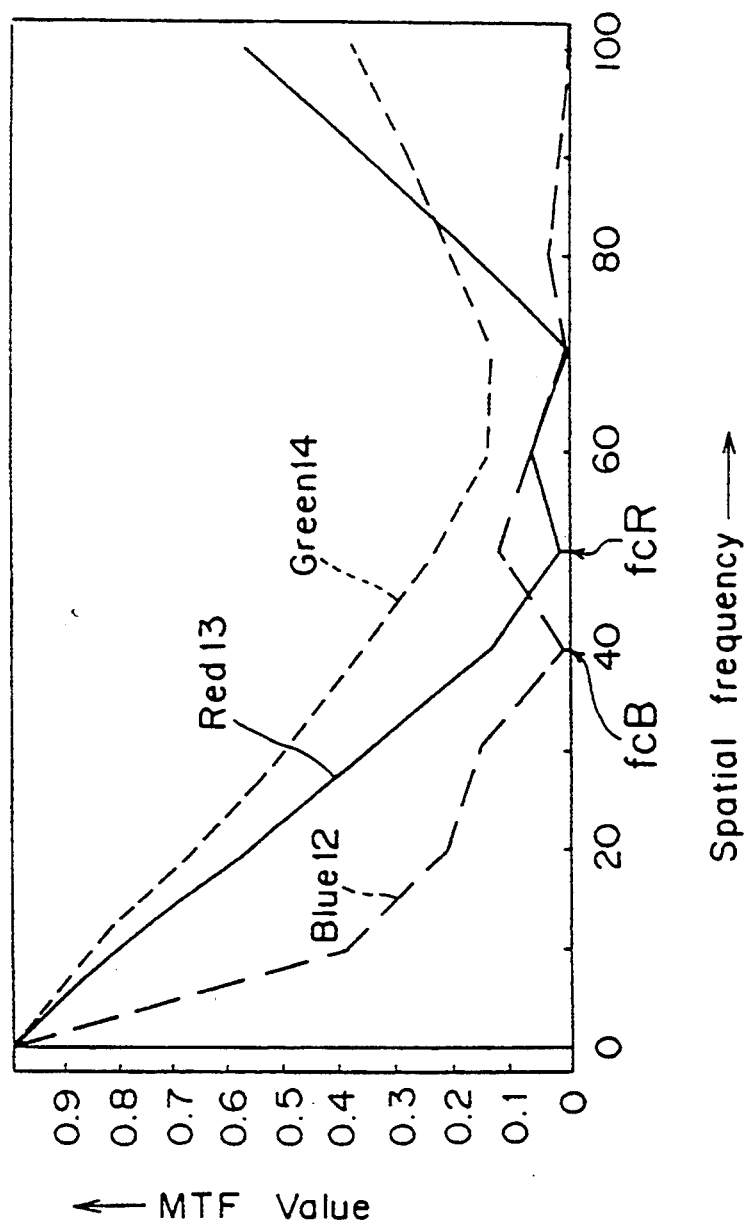
FIG. 3 is a graph of MTF value to spatial frequency characteristics of the wavelength-selective phase-grating type optical low-pass filter shown in FIGS. 2a and 2b, showing characteristic curves thereof in respective wavelength bands of red, green and blue.

FIG. 3 is a graph of a MTF value to spatial frequency characteristics of the wavelength-selective phase-grating type optical low-pass filter shown in FIGS. 2a and 2b, showing characteristic curves 12, 13 and 14 thereof, respectively, at respective wavelength bands of blue, red and green. In FIG. 3, fcR is a cut-off spatial frequency within the wavelength band of red, and fcB is a cut-off spatial frequency within the wavelength band of blue.

When there is used the optical low-pass filter 3 having the MTF value frequency characteristics shown in FIG. 3, the positional relationship between the optical low-pass filter 3 and the image forming surface 5 and the shape of the phase difference of the phase grating of the optical low-pass filter 3 are adjusted so that the cut-off spatial frequency of this optical system to be set so as to prevent generation of color Moire or phantom image due to the blue and red components of the color filter is set to a spatial frequency between the cut-off spatial frequencies fcB and fcR.

As is apparent from FIG. 3, the MTF value within the wavelength band of green at the cut-off spatial frequency of this system becomes sufficiently high, while the MTF value within the wavelength band of red or blue at the cut-off spatial frequency of this optical system becomes sufficiently low. This results in that the red and blue components can not be detected at the higher spatial frequencies.

Figure 8:
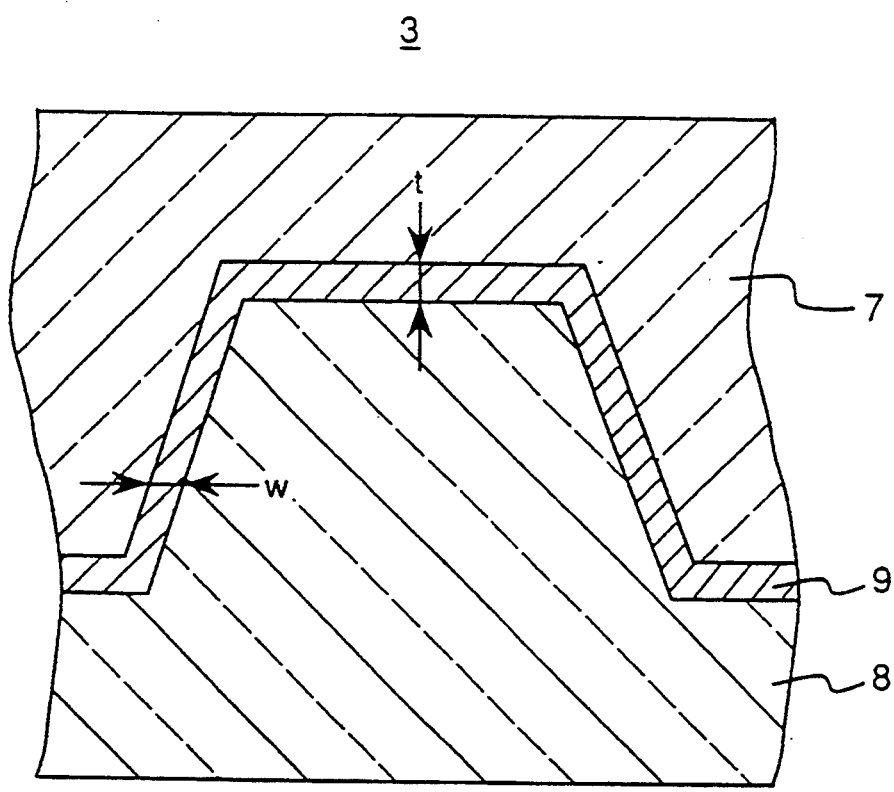
FIG. 8 is an enlarged schematic cross sectional view of the wavelength-selective phase-grating type optical low-pass filter shown in FIGS. 2 and 3, showing a thickness t in the vertical direction of the adhesive layer and a width w in the horizontal direction thereof.

FIG. 8 is an enlarged schematic cross sectional view of the wavelength-selective phase-grating type optical low-pass filter 3 shown in FIGS. 2a and 2b, showing a thickness "t" in the vertical direction of the adhesive layer 9 and a width "w" in the horizontal direction thereof. In the present simulation, t=5 mm and w=2 mm.

Figure 9:
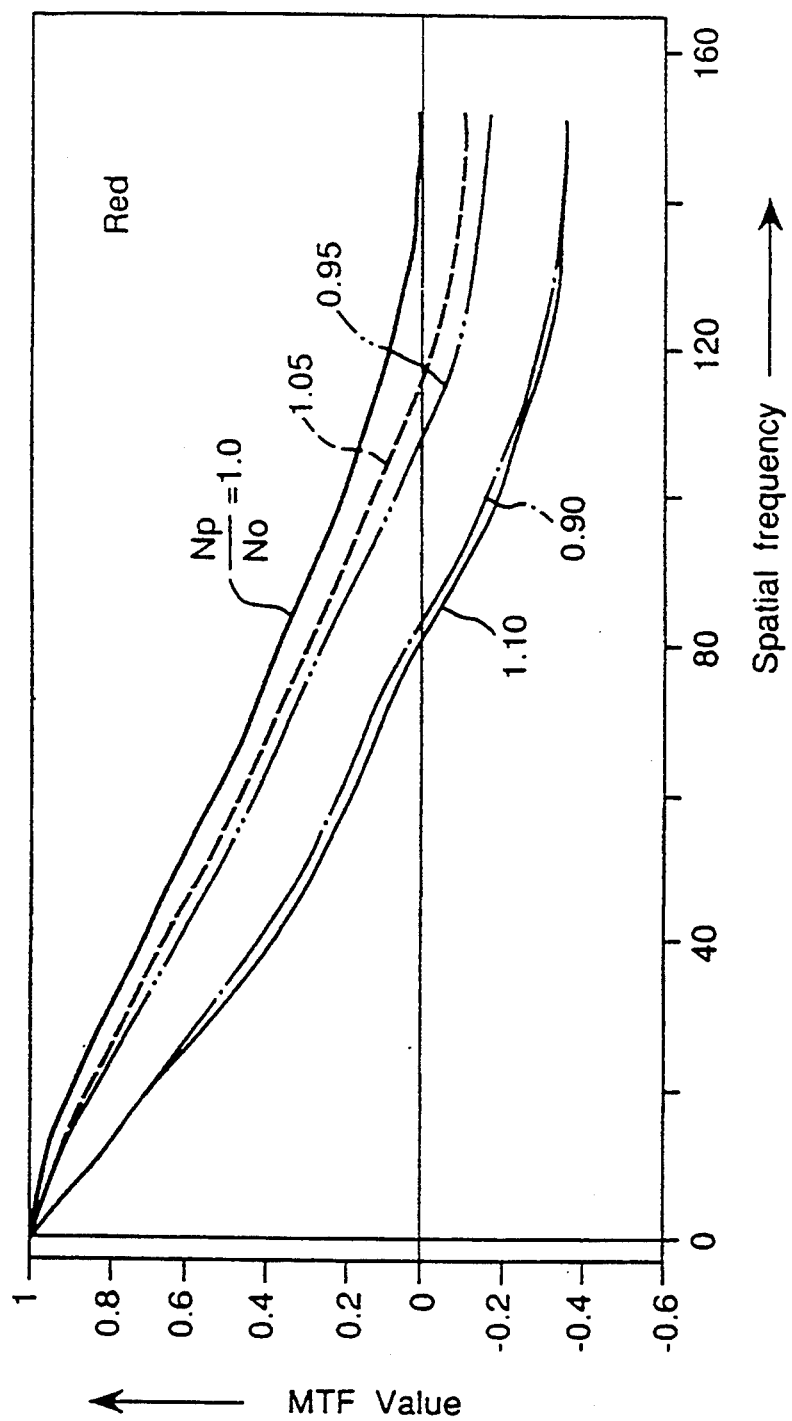
FIG. 9 is a graph of MTF value to spatial frequency characteristics in the wavelength band of red, with a parameter of a ratio of a refractive index of the adhesive layer to a refractive index of the transparent layer.

FIG. 9 is a graph of MTF value to spatial frequency characteristics in the wavelength band of red, with a parameter of a ratio $Np(\lambda) / No(\lambda)$ of a refractive index $Np(\lambda)$ of the adhesive layer 9 to a refractive index $No(\lambda)$ of the transparent layer 7, which is changed in a range from 0.9 to 1.1, wherein $\lambda$ is set to a wavelength in a range from 470 nm to 580 nm.

Figure 10:
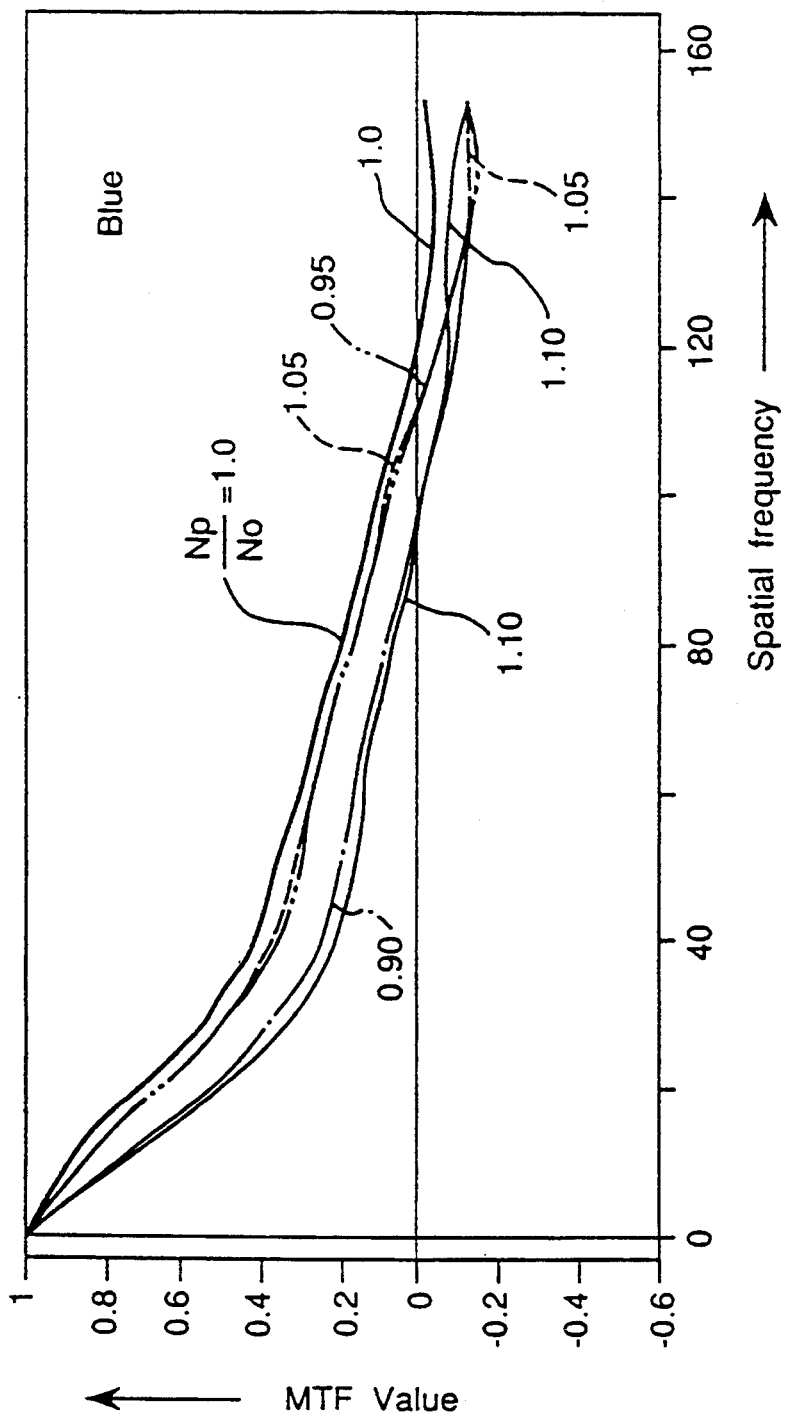
FIG. 10 is a graph of MTF value to spatial frequency characteristics in the wavelength band of blue, with the parameter of the ratio of the refractive index of the adhesive layer to the refractive index of the transparent layer.

FIG. 10 is a graph of MTF value to spatial frequency characteristics in the wavelength band of blue, with the parameter of the ratio $Np(\lambda) / No(\lambda)$ which is changed in a range from 0.9 to 1.1.

Figure 11:
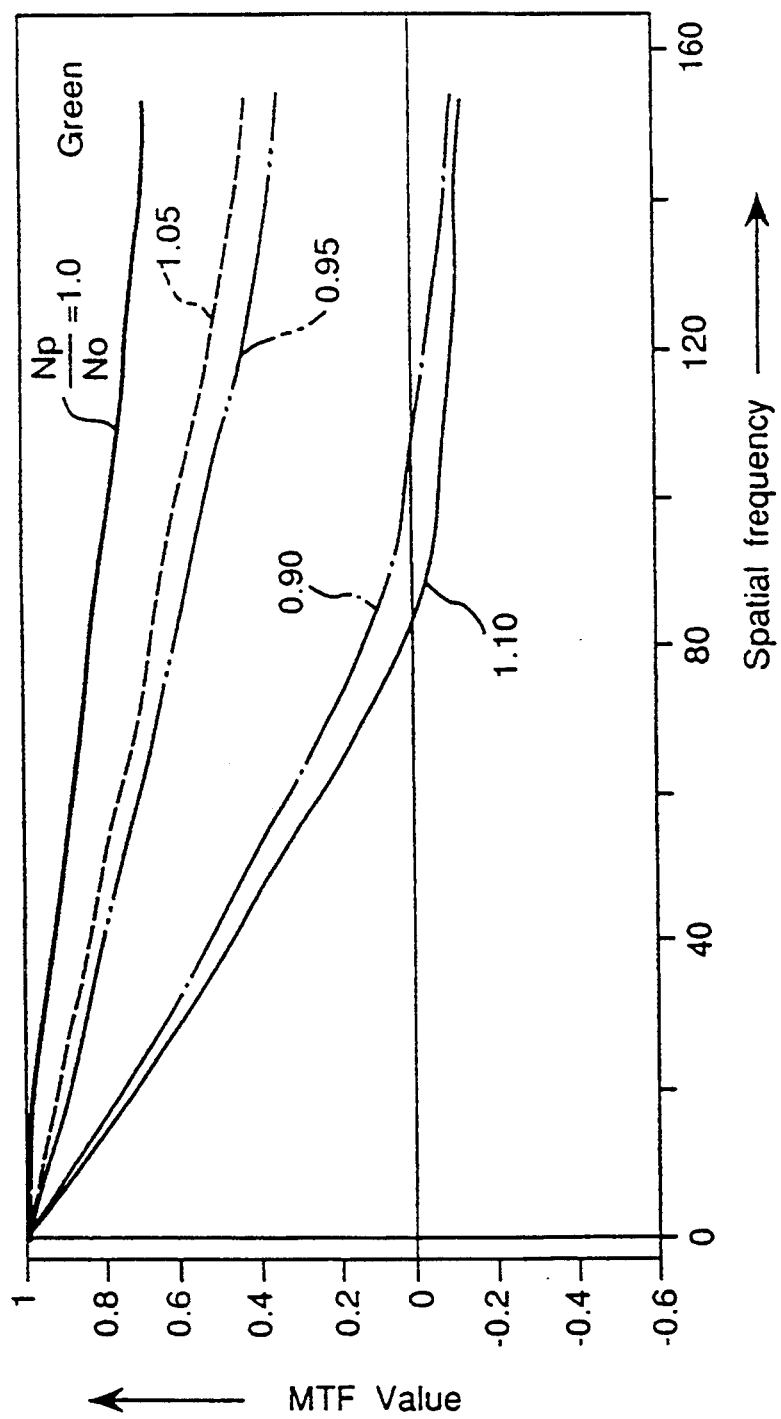
FIG. 11 is a graph of MTF value to spatial frequency characteristics in the wavelength band of green, with the parameter of the ratio of the refractive index of the adhesive layer to the refractive index of the transparent layer.

FIG. 11 is a graph of MTF value to spatial frequency characteristics in the wavelength band of green, with the parameter of the ratio $Np(\lambda) / No(\lambda)$ which is changed in a range from 0.9 to 1.1.

It is to be noted that each of the MTF values shown in FIGS. 9 to 11 includes a sign representing a direction of the phase thereof.

As is apparent from FIGS. 9 to 11, in order to prevent the attenuation or decrease of the MTF value in the wavelength band of green at the higher spatial frequency as compared with the MTF values in the wavelength bands of red and blue, namely, to set the cut-off spatial frequency of wavelength band of green to a spatial frequency higher than those of wavelength band of red and blue, it is necessary to preferably satisfy the following equation (10):

$$0.9 < Np(\lambda)/No(\lambda) < 1.1 \quad (10)$$

and further, more preferably, it is necessary to satisfy the following equation (11):

$$0.95 \leq Np(\lambda)/No(\lambda) \leq 1.05 \quad (11)$$

Therefore, satisfying the equation (10) or (11) leads to improvement of the resolution or an improved higher resolution in the visual characteristics.

<Optical system comprising optical low-pass filter>

Figure 5:
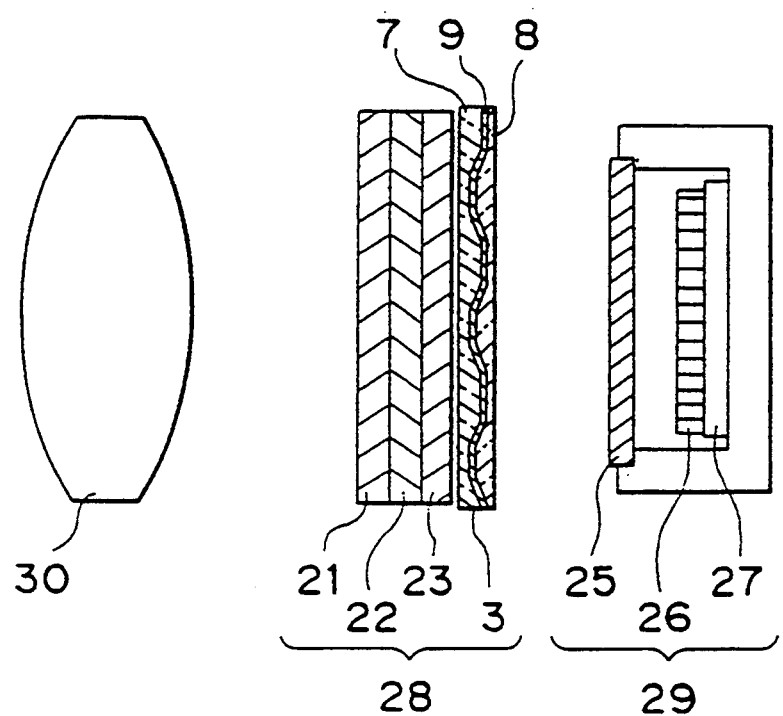
FIG. 5 is a schematic cross sectional view of an optical system comprising the wavelength-selective phase-grating type optical low-pass filter shown in FIGS. 2a and 2b.

FIG. 5 shows an optical system for obtaining a doubled horizontal resolution, using the optical low-pass filter 3 of the preferred embodiment according to the present invention. In this case, the low-pass effects of the present invention is utilized in a horizontal direction, which is defined as a horizontal direction when seeing the front surface of the optical low-pass filter 2, while a vertical direction is defined as a vertical direction perpendicular to the horizontal direction on the surfaces of the optical low-pass filter 3.

Referring to FIG. 5, reference numeral 30 denotes a lens system. There is further provided close to the lens system 30, an optical low-pass filter 21 for limiting or attenuating the spatial frequency components which propagate at a spatial frequency equal to half the Nyquist frequency of a CCD image sensor 27, in order to take into consideration the sampling frequency of the CCD image sensor 27 with respect to the vertical direction perpendicular to the horizontal direction on the surfaces of the optical low-pass filter 3. The reason why the cut-off frequency is set to be half the Nyquist frequency is as follows. The limit of the CCD image sensor 27 for picking up an subject image in the case of no color filter or a monochrome state is defined as the Nyquist frequency. However, there may be a possibility of continuously picking up the same color components when using the color filter, and the optical low-pass filter 21 has only a sampling frequency equal to half the sampling frequency in the monochrome state.

On the other hand, with respect to the horizontal direction, since the components of color Moire is limited or attenuated by the optical low-pass filter 3 of the present invention, the Nyquist frequency of the CCD image sensor 27 is preferably set as the cut-off spatial frequency required for the conventional low-pass filter. For this purpose, an optical low-pass filter 22 is provided.

In other words, the optical low-pass filter 21 attenuates the spatial frequency components in the vertical direction higher than half the Nyquist frequency of the CCD image sensor 27. Further, the optical low-pass filter 22 attenuates the spatial frequency components in the horizontal direction higher than the Nyquist frequency of the CCD image sensor 27.

Further, there is provided an infrared radiation cut filter 23 for attenuating the frequency components of the infrared rays. As shown in FIG. 5, the filters 21, 22, 23 and 3 are provided for constituting an optical filter system 28, in this order so that the optical low-pass filter 21 is located on the side of the lens system 30. The optical filter system 28 is located between the lens system 30 and a CCD image sensor unit 29.

It is to be noted that the order for arranging the filters 21, 22, 23 and 3 is not limited to this, and any order thereof may be set. Further, each of the filters 21, 22, 23 and 3 may be turned over.

In the above-mentioned preferred embodiment shown in FIG. 5, the filters 21, 22, 23 and 3 have respective above-mentioned functions, respectively. Further, the low-pass effects of the optical low-pass filters can be improved by combining each of the respective above filters 21, 22, 23 and 3 with a wave plate and an optical low-pass filter having a cut-off spatial frequency different from that of each of the respective above filters 21, 22, 23 and 3. It is required for these optical low-pass filters to set the MTF value of the optical system at a desirable cut-off spatial frequency to a sufficiently small value, and also to suppress or decrease the MTF value in the spatial frequency band higher than the cut-off spatial frequency of the present optical system. If an optical low-pass filter is constituted by only one crystal plate, the MTF value increases at the spatial frequency slightly higher than the cut-off spatial frequency. Therefore, in order to reduce this influence, it is necessary to provide a sufficient low-pass characteristic at the cut-off spatial frequency, and further, it is necessary to decrease the MTF value in the spatial frequency band higher than the cut-off spatial frequency.

Further, there are provided in the solid-state CCD image sensor unit 29, a protection glass 25, a color filter 26, and the CCD image sensor 27 for converting the subject image into electric signals using the sampling frequency equal to the Nyquist frequency.

In this embodiment shown in FIG. 5, the optical low-pass filter 3 has only the above-mentioned low-pass effects in the horizontal direction. Further, since the green components of the image data are almost not influenced by the low-pass effects, it is necessary to provide not only the optical low-pass filter 21 for obtaining the low-pass effects in the vertical direction but also the optical low-pass filter 22 for obtaining the low-pass effects in the horizontal direction in order to attenuate the green components.

<Video camera>

Figure 6:
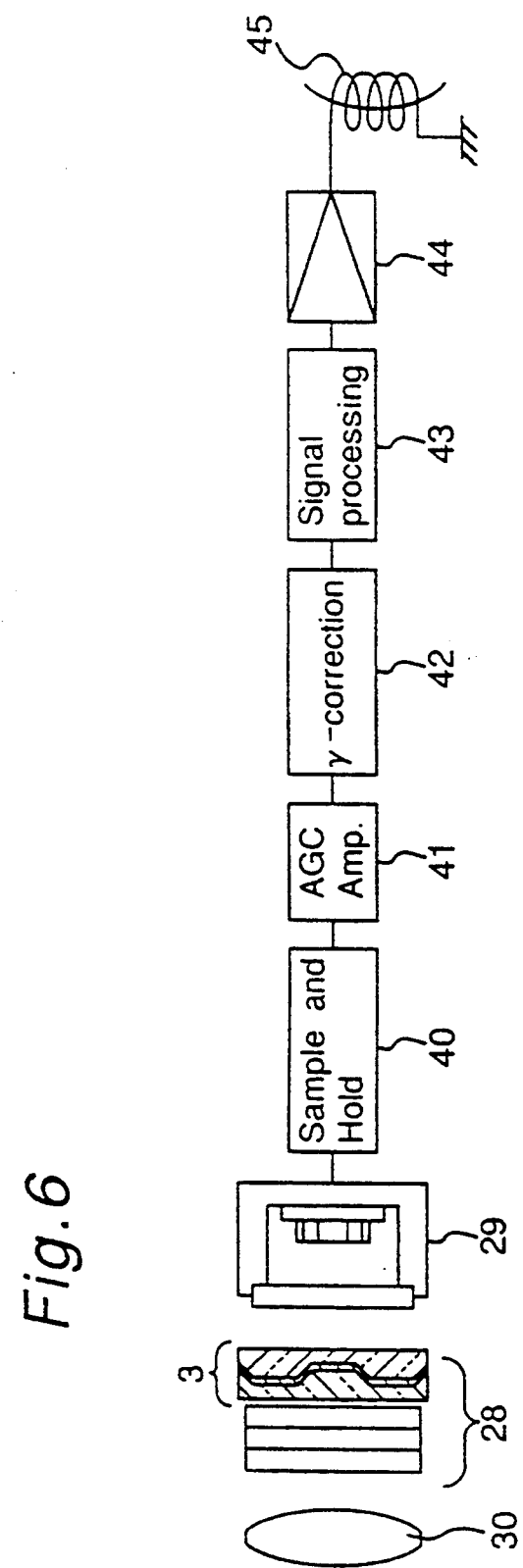
FIG. 6 is a schematic block diagram of an image processing system of a video camera comprising the wavelength-selective phase-grating type optical low-pass filter shown in FIGS. 2a and 2b.

FIG. 6 shows an image processing system of a video camera of the preferred embodiment, comprising the wavelength-selective phase-grating type optical low-pass filter 3 shown in FIGS. 2a and 2b.

Referring to FIG. 6, there are provided the lens system 30, the optical filter system 28 comprising the optical low-pass filter 3 of the present invention, and the CCD image sensor unit 29. The image sensor unit 29 converts the received subject image into sampled electric image signals, and outputs the sampled electric image signals through a sample hold circuit 40, an automatic gain control (AGC) amplifier 41, and a γ-correction circuit 42, to a signal processing circuit 43. The signal processing circuit 43 makes luminance signals and color signals of red, green and blue, respectively corresponding to the red, green and blue wavelength bands for which a predetermined low-pass filtering and a predetermined white balance process have been effected, then generates an FM signal including the above-mentioned luminance signals and the color signals, namely, the FM signal obtained by frequency-modulating a predetermined carrier wave according to the luminance signals and the color signals, and outputs the FM signal through a wide band amplifier 44 to a magnetic head 45 for recording the FM signal onto a magnetic tape.

Since the optical filter system 28 comprises the optical low-pass filter 3 of the present invention, the weight of the luminance signal of green becomes relatively large among all the luminance signals, and the cut-off spatial frequency of the wavelength band of green can be set to a spatial frequency higher than those of the wavelength bands of red and blue. This results in a higher resolution in the visual characteristics as compared with the conventional optical low-pass filters.

<Modification>

In the optical low-pass filter 3 of the above-mentioned preferred embodiment, as shown in FIGS. 2a and b, each of respective boundary surfaces of a pair of transparent layers 7 and 8 has a cross section having such a shape that a plurality of trapezoids are periodically formed in the X-axis direction so that the respective boundary surfaces thereof are parallel to each other. However, the present invention is not limited to this, the following modifications can be used.

Figure 4:
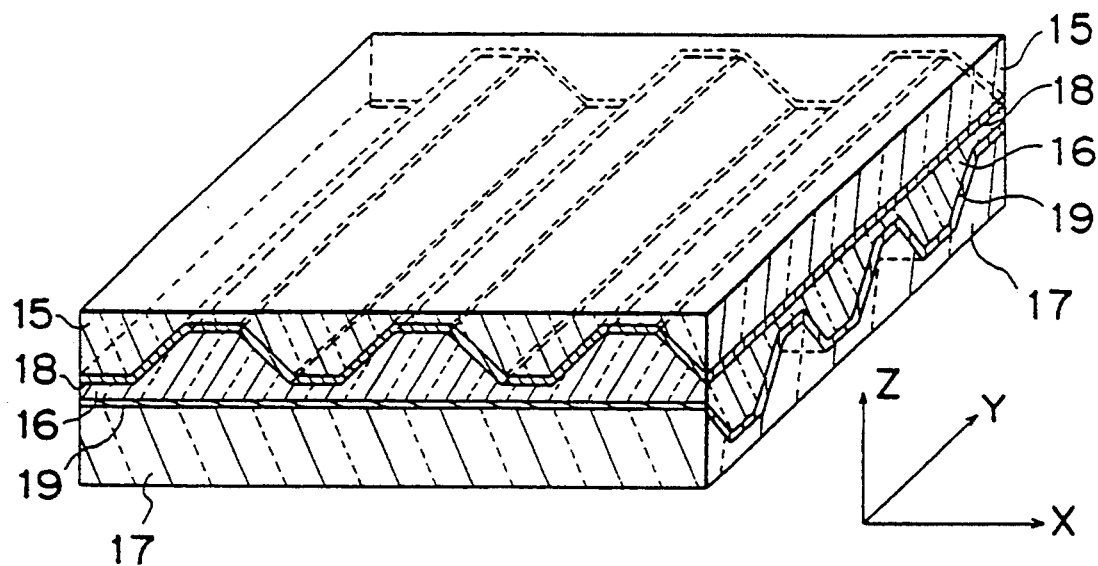
FIG. 4 is a schematic perspective view of a wavelength-selective phase-grating type optical low-pass filter of another preferred embodiment according to the present invention.

FIG. 4 is a schematic perspective view of a wavelength-selective phase-grating type optical low-pass filter of another preferred embodiment according to the present invention.

The optical low-pass filter shown in FIG. 4 comprises three transparent layers 15, 16 and 17, an adhesive layer 18 inserted between the adjacent layers 15 and 16, and another adhesive layer 19 inserted between the adjacent layers 16 and 17. This structure of the optical low-pass filter comprises two adhesive layers 18 and 19, and then, in a manner similar to that of the above-mentioned preferred embodiment shown in FIGS. 2a and 2b, each of respective boundary surfaces of a pair of transparent layers 15 and 16 has a cross section having such a shape that a plurality of trapezoids are periodically formed in the X-axis direction, while each of respective boundary surfaces of a pair of transparent layers 16 and 17 has a cross section having such a shape that a plurality of trapezoids are periodically formed in the Y-axis direction. Therefore, a first phase difference is generated unidimensionally in the X-axis direction by the adhesive layer 18, while another second phase difference is generated unidimensionally in the Y-axis direction by another adhesive layer 19. In this case, when cutting the optical low-pass filter at respective points along the Y-axis direction in parallel to a ZX surface, respective cross sections are the same as each other. On the other hand, when cutting the optical low-pass filter at respective points along the X-axis direction in parallel to a YZ surface, respective cross sections are the same as each other.

In the above-mentioned optical low-pass filter shown in FIG. 4, since the first phase difference is generated in the X-axis direction while the second phase difference is generated in the Y-axis direction, the present optical low-pass filter has improvement in the resolution or a higher resolution in the visual characteristics in the two directions of the horizontal and vertical directions perpendicular to each other. In other words, the wavelength-selective low-pass effect can be obtained with respect to the entire part of a two-dimensional image.

Figure 7:
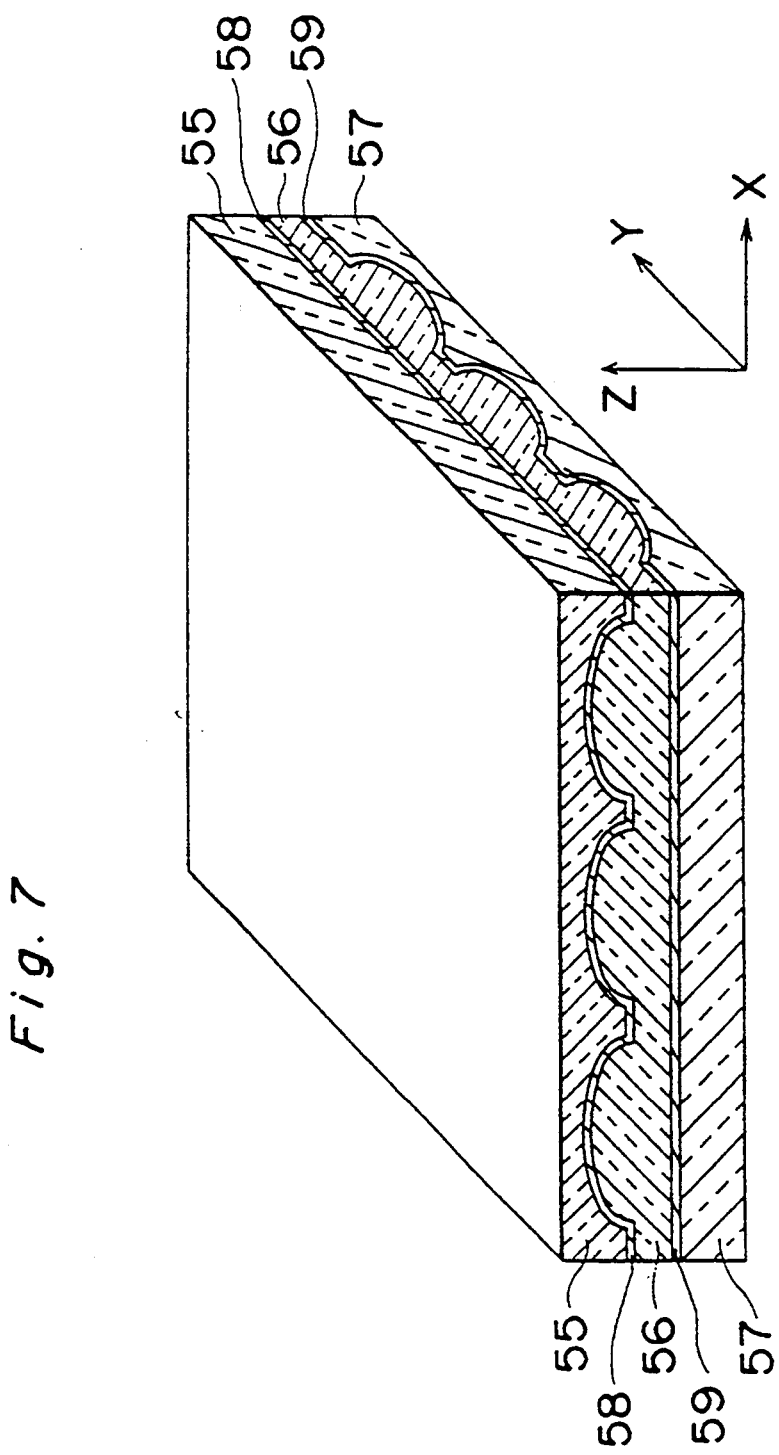
FIG. 7 is a schematic perspective view of a wavelength-selective phase-grating type optical low-pass filter of a modification of another preferred embodiment shown in FIG. 4.

Further, as shown in FIG. 7, another optical low-pass filter comprises three transparent layers 55, 56 and 57, a first adhesive layer 58 inserted between the transparent layers 55 and 56, and a second adhesive layer 59 inserted between the transparent layers 56 and 57. On the cross section of an optical low-pass filter, there are formed as boundary surfaces in each of the two adhesive layers 58 and 59, a plurality of half-ellipses in stead of a plurality of trapezoids. This optical low-pass filter has improvement in the resolution or a higher resolution in the visual characteristics in the two directions of the horizontal and vertical directions perpendicular to each other.

In the above-mentioned modification shown in FIG. 7, there are provided three transparent layers 15, 16 and 17. However, the present invention is not limited to this, and then the optical low-pass filter may comprise four or more transparent layers, between respective adjacent transparent layers of which an adhesive layer is inserted.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A wavelength-selective phase-grating type optical low-pass filter comprising:
   at least a pair of adjacent first and second transparent layers; and
   at least one adhesive layer provided between said pair of adjacent first and second transparent layers,
   wherein said pair of adjacent first and second transparent layers is stacked through said adhesive layer on each other in a phase grating form for generating a phase difference distribution on the boundary surface between said pair of adjacent first and second transparent layers,
   wherein said optical low-pass filter satisfies the following conditions under a condition of 470 nm < $\lambda$ < 580 nm:
   (a) $\nu d1 < \nu d2$ or $\nu d1 > \nu d2$, and
   (b) $0.9 < Np(\lambda) / No(\lambda) < 1.1$,
   where $\lambda$ is a wavelength of light passing through said optical low-pass filter,
   No ($\lambda$) and Ni ($\lambda$) are refractive indexes of said first and second transparent layers, respectively, at said wavelength $\lambda$, which are substantially the same as each other,
   $\nu d1$ and $\nu d2$ are Abbe's numbers of said first and second transparent layers, respectively, and
   Np($\lambda$) is a refractive index of said adhesive layer at said wavelength $\lambda$,
   thereby obtaining such low-pass effects as preventing decrease of an MTF value of the wavelength band of green.

2. The wavelength-selective phase-grating type optical low-pass filter as claimed in claim 1,
   wherein each of respective boundary surfaces of said first and second transparent layers has a cross section having such a shape that a plurality of trapezoids are periodically formed in a predetermined direction so that the respective boundary surfaces thereof are parallel to each other.

3. The wavelength-selective phase-grating type optical low-pass filter as claimed in claim 2,
   wherein said phase grating form satisfies the following conditions:

$$0.1 < a/A < 0.9, \quad (a)$$
$$0.1 < b/A < 0.9, \quad (b)$$
$$(a + b)/A < 1.0, \text{ and} \quad (c)$$

$$\frac{\frac{1}{2} - \frac{4f\lambda Rd}{A}}{\frac{1}{2} - \frac{4f\lambda Bd}{A}} < \left(\frac{NR}{NB}\right)^2 < \frac{2 - \frac{4f\lambda Rd}{A}}{1 - \frac{4f\lambda Bd}{A}}, \quad (d)$$

where A is a pitch of said phase grating of said plurality of trapezoids,
a is a width of a top flat portion of each of said plurality of trapezoids,
b is a width of a bottom flat portion of each of said plurality of trapezoids,
d is a distance between said optical low-pass filter and an image forming surface of an image sensor provided close to said second transparent layer,
f is a predetermined cut-off spatial frequency,
$\lambda R$ is a center wavelength of the wavelength band of red,
$\lambda B$ is a center wavelength of the wavelength band of blue,
NR is a difference between said refractive indexes of said first and second transparent layers at said wavelength $\lambda R$, and
NB is a difference between said refractive indexes of said first and second transparent layers at said wavelength $\lambda B$.

4. The wavelength-selective phase-grating type optical low-pass filter as claimed in claim 1, further comprising:
   a third transparent layer; and
   a further adhesive layer through which said second and third transparent layers stacked on each other in a further phase grating form for generating a further phase difference distribution on the boundary surface between said second and third transparent layers, said further phase grating form being perpendicular to said phase grating form.

5. The wavelength-selective phase-grating type optical low-pass filter as claimed in claim 4,
   wherein each of respective boundary surfaces of said first and second transparent layers has a cross section having such a shape that a plurality of trapezoids are periodically formed in a predetermined direction so that the respective boundary surfaces thereof are parallel to each other, and each of respective boundary surfaces of said second and third transparent layers has a further cross section having such a shape that a plurality of trapezoids are periodically formed in a direction perpendicular to said predetermined direction so that the respective boundary surfaces thereof are parallel to each other.

6. The wavelength-selective phase-grating type optical low-pass filter as claimed in claim 5, wherein each of said phase grating form and said further phase grating form satisfies the following conditions:

$$0.1 < a/A < 0.9, \tag{a}$$
$$0.1 < b/A < 0.9, \tag{b}$$
$$(a + b)/A < 1.0, \text{ and} \tag{c}$$

$$\frac{\frac{1}{2} - \frac{4f\lambda Rd}{A}}{\frac{1}{2} - \frac{4f\lambda Bd}{A}} < \left(\frac{NR}{NB}\right)^2 < \frac{2 - \frac{4f\lambda Rd}{A}}{1 - \frac{4f\lambda Bd}{A}}, \tag{d}$$

where A is a pitch of said phase grating of said plurality of trapezoids, a is a width of a top flat portion of each of said plurality of trapezoids, b is a width of a bottom flat portion of each of said plurality of trapezoids, d is a distance between said optical low-pass filter and an image forming surface of an image sensor provided close to said second transparent layer, f is a predetermined cut-off spatial frequency, $\lambda R$ is a center wavelength of the wavelength band of red, $\lambda B$ is a center wavelength of the wavelength band of blue, NR is a difference between said refractive indexes of said first and second transparent layers at said wavelength $\lambda R$, and NB is a difference between said refractive indexes of said first and second transparent layers at said wavelength $\lambda B$.

7. An optical system comprising:

an image sensor for converting an image of a subject into an electric signal, using a sampling frequency equal to a Nyquist frequency;

an optical filter system; and a lens system for focusing said image onto said image sensor through said optical filter system;

wherein said optical filter system comprises:

a first optical low-pass filter for attenuating spatial frequency components in a vertical direction higher than half the Nyquist frequency of said image sensor;

a second optical low-pass filter for attenuating spatial frequency components in a horizontal direction perpendicular to said vertical direction higher than the Nyquist frequency of said image sensor; and a third optical low-pass filter being a wavelength-selective phase-grating type optical low-pass filter, wherein said third optical low-pass filter comprises:

at least a pair of adjacent first and second transparent layers; and at least one adhesive layer provided between said pair of adjacent first and second transparent layers, wherein said pair of adjacent first and second transparent layers is stacked through said adhesive layer on each other in a phase grating form for generating a phase difference distribution on the boundary surface between said pair of adjacent first and second transparent layers, wherein said optical low-pass filter satisfies the following conditions under a condition of 470 nm<$\lambda$<580 nm:

(a) $\nu d1 < \nu d2$ or $\nu d1 > \nu d2$, and (b) $0.9 < Np(\lambda) / No(\lambda) < 1.1$, where $\lambda$ is a wavelength of light passing through said optical low-pass filter, No ($\lambda$) and Ni ($\lambda$) are refractive indexes of said first and second transparent layers, respectively, at said wavelength $\lambda$, which are substantially the same as each other, $\nu d1$ and $\nu d2$ are Abbe's numbers of said first and second transparent layers, respectively, and $Np(\lambda)$ is a refractive index of said adhesive layer at said wavelength $\lambda$, thereby obtaining such low-pass effects as preventing decrease of an MTF value of the wavelength band of green.

8. A camera comprising:

an optical system which comprises:

an image sensor for converting an image of a subject into an electric signal, Using a sampling frequency equal to a Nyquist frequency;

an optical filter system; and a lens system for focusing said image onto said image sensor through said optical filter system;

wherein said optical filter system comprises:

a first optical low-pass filter for attenuating spatial frequency components in a vertical direction higher than half the Nyquist frequency of said image sensor;

a second optical low-pass filter for attenuating spatial frequency components in a horizontal direction perpendicular to said vertical direction higher than the Nyquist frequency of said image sensor; and a third optical low,pass filter being a wavelength-selective phase-grating type optical low-pass filter, wherein said third optical low-pass filter comprises:

at least a pair of adjacent first and second transparent layers; and at least one adhesive layer provided between said pair of adjacent first and second transparent layers, wherein said pair of adjacent first and second transparent layers is stacked through said adhesive layer on each other in a phase grating form for generating a phase difference distribution on the boundary surface between said pair of adjacent first and second transparent layers, wherein said optical low-pass filter satisfies the following conditions under a condition of 470 nm<$\lambda$<580 nm:

(a) $\nu d1 < \nu d2$ or $\nu d1 > \nu d2$, and (b) $0.9 < Np(\lambda) / No(\lambda) < 1.1$, where $\lambda$ is a wavelength of light passing through said optical low-pass filter.

No ($\lambda$) and Ni ($\lambda$) are refractive indexes of said first and second transparent layers, respectively, at said wavelength $\lambda$, which are substantially the same as each other, $\nu d1$ and $\nu d2$ are Abbe's numbers of said first and second transparent layers, respectively, and $Np(\lambda)$ is a refractive index of said adhesive layer at said wavelength $\lambda$, thereby obtaining such low-pass effects as preventing decrease of an MTF Value Of the wavelength band of green; and a recording means for recording said electric signal corresponding to said image of said subject into a recording medium.

* * * * *